H. H. HILL & R. ABELL.
SIGNAL BUOY.
APPLICATION FILED DEC. 22, 1902.
1,112,138.
Patented Sept. 29, 1914.
4 SHEETS—SHEET 3.
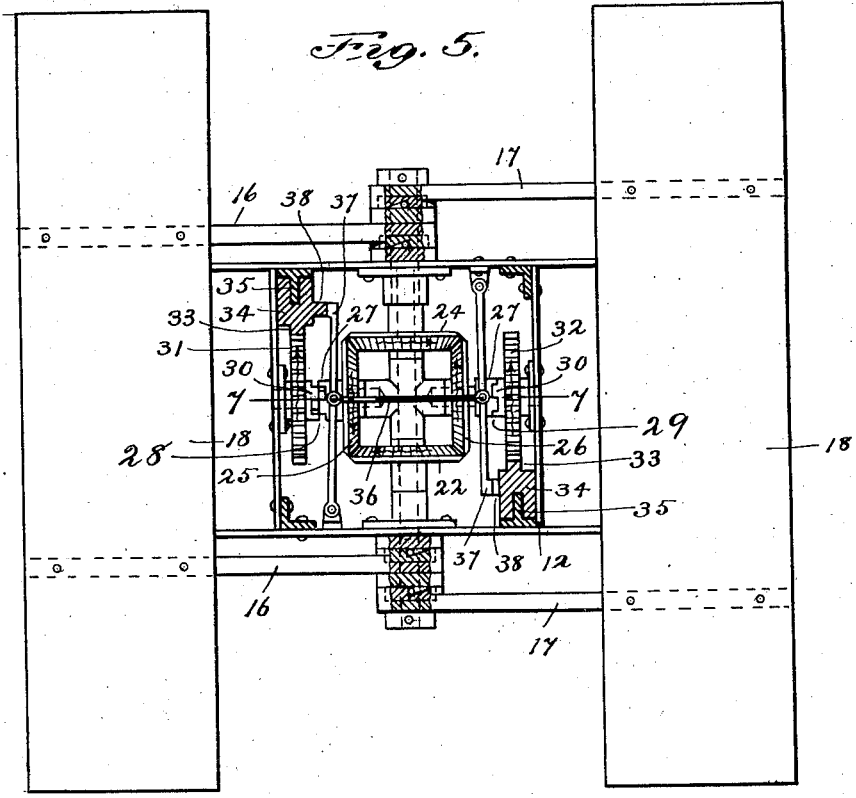
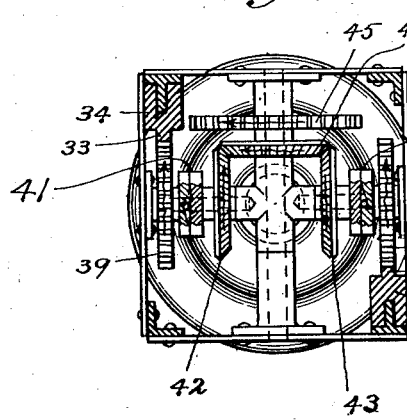
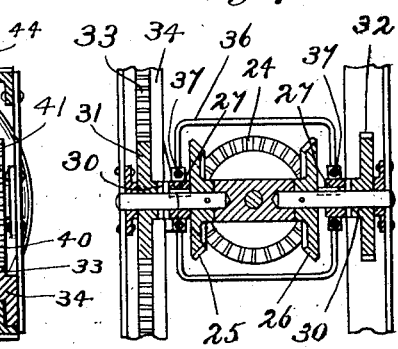
WITNESSES:
Peter W. Pezzetti
Adeline C. Ratigan
INVENTORS.
Horace H. Hill
Rollin Abell
BY
Wright, Brown & Quinby
ATTORNEYS.

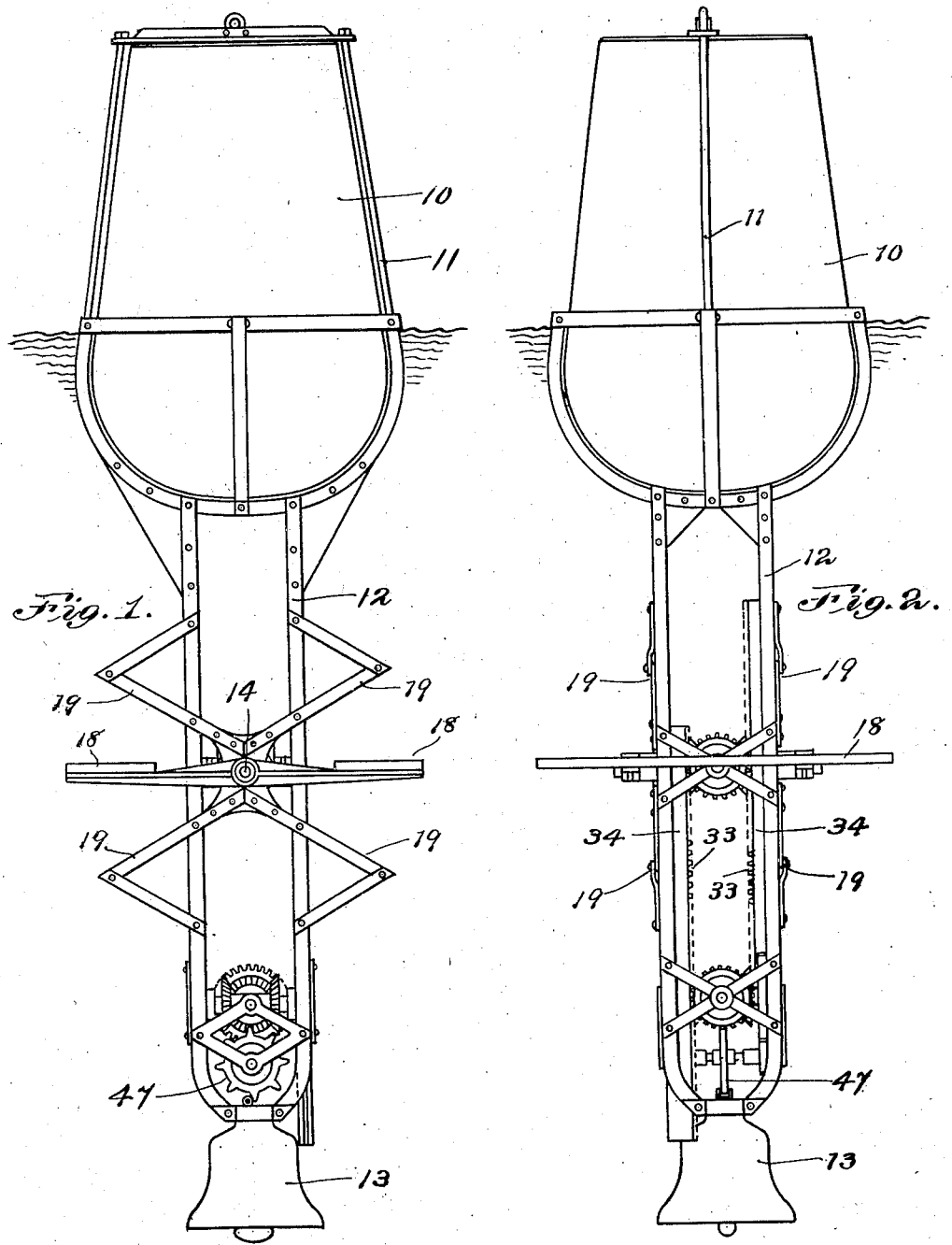

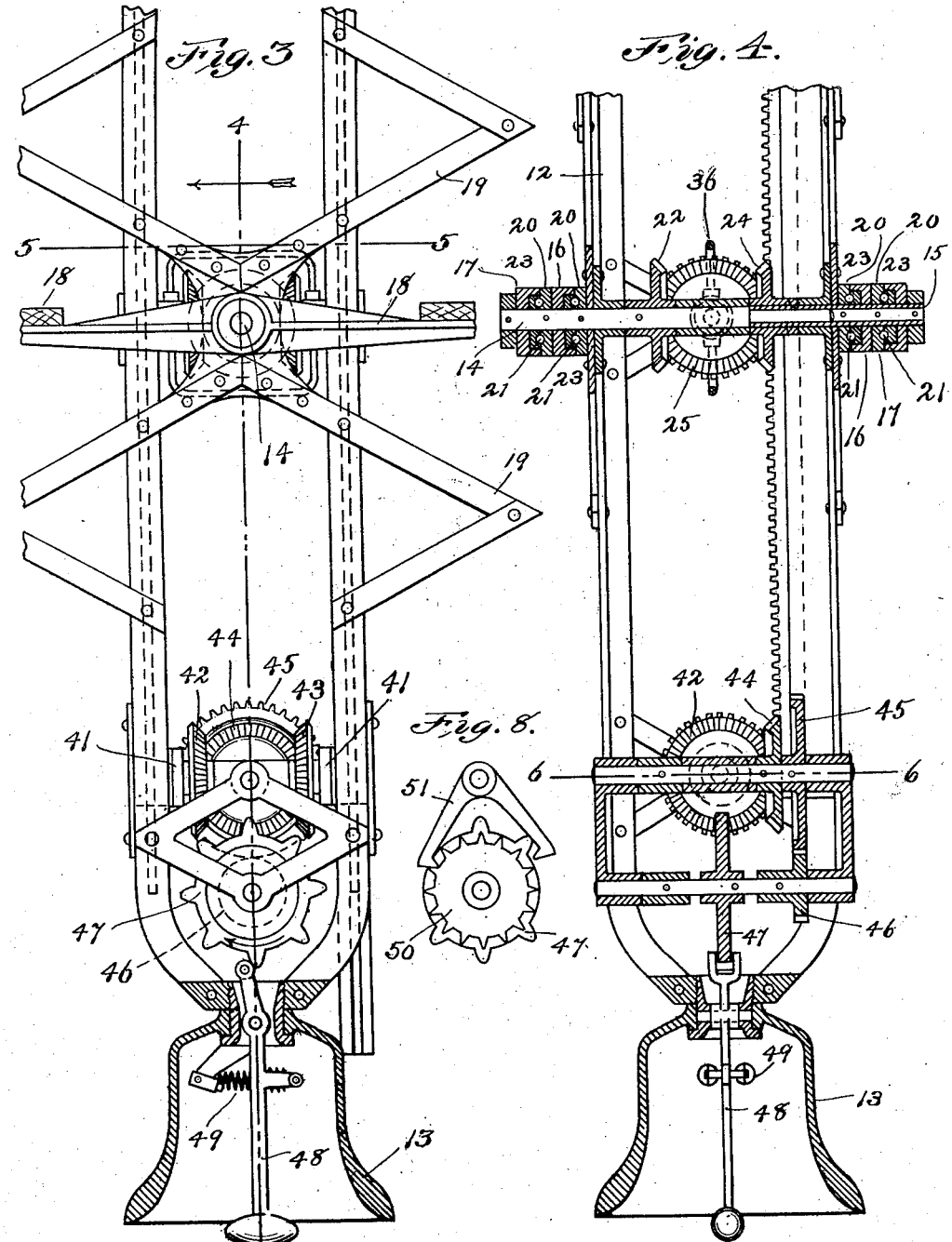

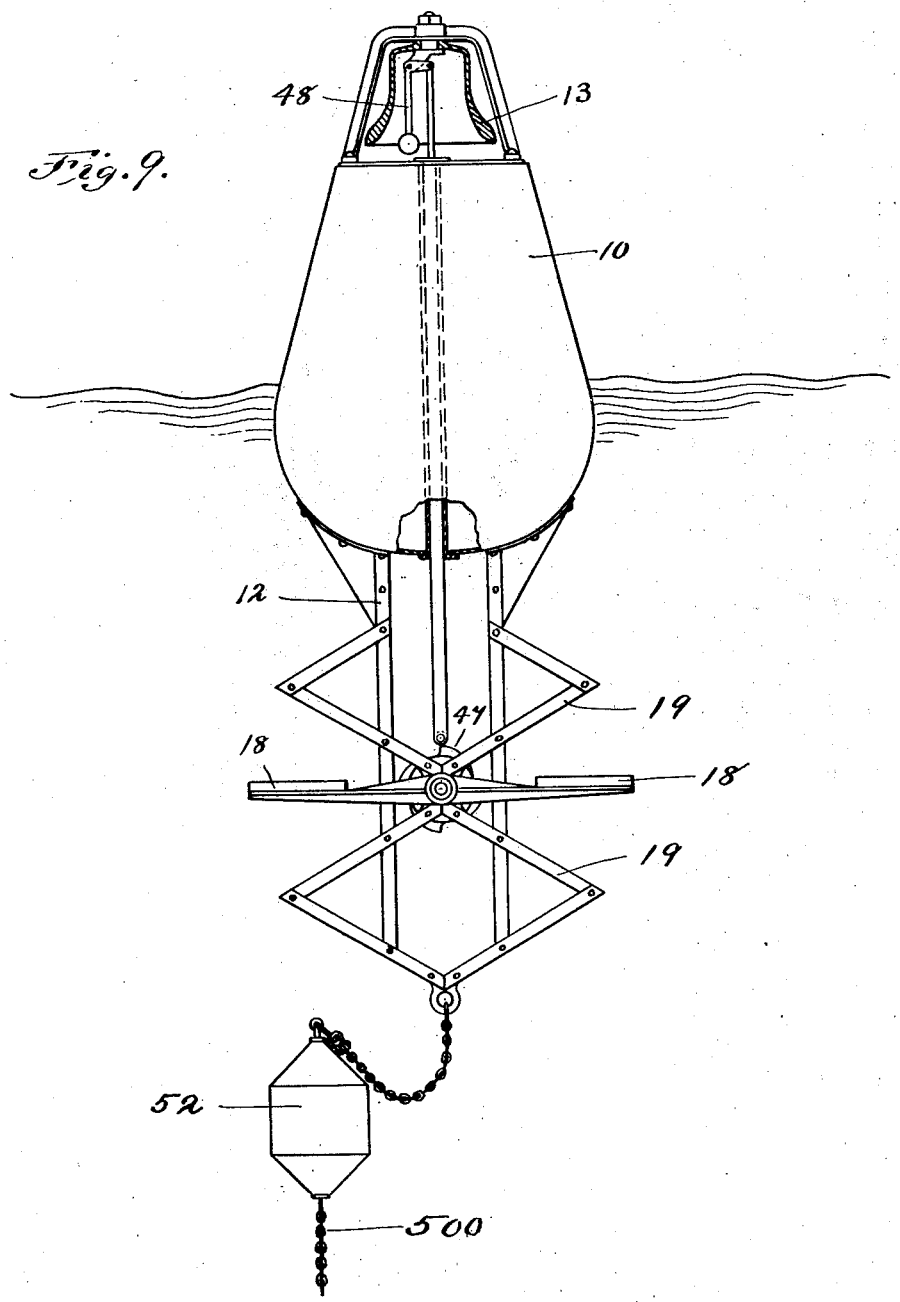

UNITED STATES PATENT OFFICE.

HORACE H. HILL, OF SOMERVILLE, AND ROLLIN ABELL, OF BOSTON, MASSACHUSETTS, ASSIGNORS TO SUBMARINE SIGNAL COMPANY, OF BOSTON, MASSACHUSETTS, A CORPORATION OF MAINE.

SIGNAL-BUOY.

1,112,138.      Specification of Letters Patent.      Patented Sept. 29, 1914.

Application filed December 22, 1902. Serial No. 136,181.

*To all whom it may concern:*

Be it known that we, HORACE H. HILL, of Somerville, in the county of Middlesex and State of Massachusetts, and ROLLIN ABELL, of Boston, in the county of Suffolk and State of Massachusetts, have invented certain new and useful Improvements in Signal-Buoys, of which the following is a specification.

This invention consists in improvements in buoys operated by relative movement between the buoy and the water, and particularly to wave-operated buoys containing motive mechanism for converting the motion produced by the waves into work. It also relates specially to signal-buoys, the particular embodiment herein shown being a buoy provided with a signal so operated as to give signaling impulses in a regular or systematic manner, thus enabling the buoy pertaining to a particular locality to be recognized by mariners within its range.

Of the accompanying drawings,—Figure 1 represents a side elevation of a signal-buoy constructed in accordance with our invention. Fig. 2 represents an elevation at right angles to Fig. 1. Fig. 3 represents a side elevation, partly in section, on an enlarged scale, showing the lower part of the buoy-structure. Fig. 4 represents a section on line 4—4 of Fig. 3. Fig. 5 represents a section on line 5—5 of Fig. 3. Fig. 6 represents a section on line 6—6 of Fig. 4. Fig. 7 represents a section on line 7—7 of Fig. 5. Fig. 8 represents a side elevation of a modified form of bell-tongue actuator adapted to give a code-signal. Fig. 9 represents a side elevation showing a modification in which the bell is mounted above water, and also showing the means whereby we may anchor the buoy.

The same reference characters indicate the same parts in all the figures.

In the drawings, Figs. 1 to 8 inclusive, 10 is a can buoy body embraced by a frame or skeleton structure 11 from the lower side of which depends a rectangular skeleton frame 12, the latter carrying at its lower end a bell 13. At about the middle of the frame 12 is a shaft 14 alined with a hollow shaft or sleeve 15, and loose on said shaft and sleeve respectively are two pairs of arms 16 17 carrying vanes 18 18. These vanes are of a specific gravity substantially equal to that of water so that their normal position is about horizontal, the relative movements of the buoy with respect to the water which immerses the vanes causing said vanes to oscillate on their pivots. 19 19 are inclined stops or rests adapted to limit both the upward and downward movements of the vanes.

On the shaft 14 are pinned clutch-collars 20 20 between which and the complemental clutch members formed by the hubs of one arm 16 17 of each pair of vane-arms are interposed wedging rollers 21 21, said structure forming two clutches both of which tend to rotate the shaft 14 in the same direction of rotation and release said shaft from the arms 16 17 when the latter oscillate in a direction opposite to said direction of rotation. We have designated the clutches generically by the numerals 23. A bevel-gear wheel 22 is pinned to the shaft 14 so as to rotate therewith. On the sleeve 15 are two similar clutches 23 which both tend to rotate said sleeve in a direction opposite to that in which the shaft 14 and gear 22 are rotated. 24 is a bevel-gear similar to the gear 22 and secured to sleeve 15.

Meshing with the gears 22 24 are two bevel-gears 25 26 to whose shafts are splined claw-clutch members 27 27 forming halves of two clutches 28 29. The other halves 30 30 of said clutches are formed on two spur-gears 31 32 meshing with vertical racks 33 33 formed on weights 34 34 which slide on vertical guides 35 35 on the frame 12. The clutch members 27 are connected to each other by a link 36 and to pivoted levers 37 37 actuated by cams 38 38 on the weights 34 34, the effect being that when one of the clutches is thrown in the other will be thrown out and vice versa.

Near the lower ends of the weights 34 their racks 33 mesh with spur-gears 39 40. The said gears connect through clutches 41 41, similar to the clutches 23, with bevel-gears 42 43, said clutches being so arranged as to rotate their respective gears always in the same direction. The gears 42 43 mesh with a gear 44 with which rotates a spur-gear 45 meshing with a pinion 46. The latter is fast on the same shaft with a toothed wheel 47 which engages the upper end of a pivoted tongue-lever, clapper or striker 48 for striking the bell 13. Springs 49 49 act in opposition to the movement produced by the toothed wheel 47.

The operation is as follows:—The movement relatively to the water of the part of the buoy-frame 12 supporting the vanes 18 causes said vanes to oscillate on their pivots and through the clutches 23 and wheels 24 the wheels 25 26 will be rotated. The particular clutch 28 or 29 which is then operative will cause the corresponding gear 31 or 32 to be rotated and the corresponding weight 34 will be raised step-by-step. The other weight will at the same time be free to descend. The ascending motion of either weight is permitted by the clutches 41 without producing any movement in the wheels 42 43, but the descending movement of either weight produces a movement in these gears.

As soon as the ascending weight reaches a predetermined upward limit of movement its cam 38 acts on one of the arms 37 and the operative clutch 28 or 29 is thrown out, the other clutch of the pair being at the same time thrown into operation. The ascending weight therefore immediately starts to descend and the descending weight starts to ascend so that there will always be one weight ascending and one weight descending. The movement of the descending weight, transmitted from gear 42 or 43 to gear 44 and through gears 45 46 to the toothed wheel 47, causes the bell-tongue 48 to be intermittently engaged and released by the teeth of said wheel 47. At each release the springs 49 cause the tongue to strike against the bell 13 whose vibrations transmitted through the medium of the water in which the buoy floats may be received by suitable detecting apparatus on shore or attached to vessels within range of the buoy.

As the impulses of the bell are emitted or produced according to a known code or in a regular or systematic manner, the signals of each particular buoy if so arranged as to distinguish from others, will enable the buoy and the locality to be recognized. It is also evident that in addition to being given in a systematic manner, the signals are, by reason of the uniform action of the weights, produced at a predetermined rate, or a stated number in a given period of time.

Fig. 8 shows the toothed wheel 47 arranged so as to give a different code-signal from the wheel in Fig. 3 and said Fig. 8 also shown the motion of said wheel govern by an escape-wheel 50 and pawl 51.

As the invention is equally applicable to the propagation of signals through the air we have in Fig. 9 shown the bell 13 mounted above water. This figure also illustrates a novel means which we may employ for anchoring either of the two forms of buoys shown.

500 is a chain extending from the buoy to a fixed anchor 510 on bottom.

52 is a float (preferably adjustable) placed at an intermediate part of the chain and operating to take the weight of the lower part of said chain from the buoy, there being, as seen, a flexible anchoring connection from the float to the anchor, and a flexible or compensating connection from the float to the buoy. The buoy relieved of the weight of most of the chain, will be more sensitive in its movement and its mechanism will respond to smaller waves than would be the case with a great weight of chain supported wholly by the buoy.

In addition to the desirable feature of producing signals either above or below water by means of a wave-operated motor at a predetermined rate, our improved wave-motor possesses useful features of novelty, the power-storing and utilizing means being simple and effective and the action of the vanes 18 very efficient. These vanes will be oscillated both by the vertical movements of the buoy with respect to the water and also by the oscillating movements of the buoy or its movements as a whole through the water, provided these movements change direction as do those produced by waves.

We claim:—

1. In a signal buoy, in combination, a signaling means, a pair of power-storing devices, means operable by wave motion, means for operatively connecting one of said power storing devices to said wave operated means to cause power to be stored and for simultaneously causing the disconnection of the other of said devices from said wave operated means, and means for operatively connecting each of said devices with said signaling means when disconnected from said wave operated means.

2. In a signal buoy, in combination, a signaling means, a pair of power-storing devices, means operable by wave motion, automatic means for operatively connecting one of said power storing devices to said wave operated means to cause power to be stored and for simultaneously and positively causing the disconnection of the other of said devices from said wave operated means, and means for operatively connecting each of said devices with said signaling means when disconnected from said wave operated means.

3. In a signal buoy, in combination, a signaling means, a pair of power-storing devices, means operable by wave motion, means for operatively connecting one of said power storing devices to said wave operated means to cause power to be stored and for simultaneously causing the disconnection of the other of said devices from said wave operated means, and means for operatively connecting each of said devices with said signaling means to cause said device to exert the power stored thereby upon said signaling means during its entire period of disconnection from said wave operated means, said last named connecting means being inoperative when the corresponding power storing device is moved by said wave operated means.

4. In a signal buoy, in combination, a signaling means, a pair of vertically reciprocating weights, means operable by wave motion, means for operatively connecting one of said weights to said wave operated means to cause the same to be raised and for simultaneously causing the disconnection of the other of said weights from said wave operated means, and means for operatively connecting each of said weights with said signaling means when disconnected from said wave operated means.

5. In a signal buoy, signaling means, a plurality of weights, means actuated by said weights for operating said signaling means, a float, a pair of submerged pivotally oscillating fins acted upon by the water, means operated by said fins for raising said weights, and means for alternately connecting said weights with said raising means.

6. In a signal buoy, a signaling means, a plurality of power-storing devices, a float, submerged oscillating planes operable by wave motion, means actuated by said planes for accumulating power in said power-storing devices, and means actuated by said power storing devices for operating said signaling means.

7. In a signal buoy, a signaling means, a plurality of weights, means for connecting said weights and signaling means for operating said signaling means, a float, submerged oscillating planes connected therewith operable by wave motion, and means for automatically connecting said weights with said wave operable means.

8. In a signal buoy, a signaling means, a pair of weights acting successively on said means, means for operating said weights comprising a float, submerged oscillating planes and means connected therewith operable by wave motion, and means for automatically connecting said wave operated means with said weights alternately.

In testimony whereof we have affixed our signatures, in presence of two witnesses.

HORACE H. HILL.
ROLLIN ABELL.

Witnesses:
R. M. PIERSON,
ADELINE C. RATIGAN.